Figure 1:
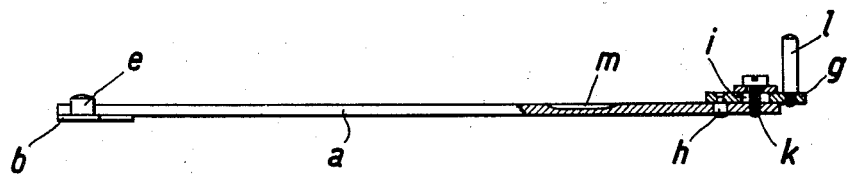

Feb. 19, 1935.  W. BAUERSFELD ET AL  1,991,997
DEVICE FOR CONNECTING AN ILLUMINATION APPARATUS TO A MICROSCOPE
Filed Feb. 21, 1934

Inventor:
Walther Bauersfeld.
Max Hübschmann.

Patented Feb. 19, 1935

1,991,997

UNITED STATES PATENT OFFICE 1,991,997

DEVICE FOR CONNECTING AN ILLUMINATION APPARATUS TO A MICROSCOPE

Walther Bauersfeld and Max Hübschmann, Jena, Germany, assignors to firm Carl Zeiss, Jena, Germany Application February 21, 1934, Serial No. 712,355
In Germany February 24, 1933

3 Claims. (Cl. 240—2)

We have filed an application in Germany, February 24, 1933, of which the following is a specification.

When effecting microscopic examinations with not too low a magnification, use is generally made of an artificial source of light independent of the microscope. The source of light, in most cases a glow or an arc-lamp equipped with an optical system, is so placed on the surface or table supporting the microscope that it directs a pencil of light rays to the mirror below the microscope stage. The pencil of rays is deflected upwardly by the said mirror and, generally by means of a condenser, directed to the object. It follows that, on account of the source of light being independent of the microscope, it is necessary to examine the position of the source of light relative to the mirror of the microscope every time the microscopic work has been interrupted and, eventually, to readjust the source of light.

The invention concerns a device for temporarily connecting an illumination apparatus to a microscope and by means of which the source of light, when once adjusted, may be given the correct position relative to the microscope subsequently to every interruption of the microscopic work, and this even if the microscope had been removed from its original position during the said interruption. According to the invention, this is effected in such a manner that a rod, which lies on the surface supporting the microscope, is attached to the foot of the microscope by means of at least two projecting parts which extend into corresponding recesses, and that this rod is connected to the illumination apparatus at two points which lie approximately in the direction of the axis of the pencil of illumination rays, the one of these points being represented by a holder which is displaceable on the rod in a direction approximately at right angles to the said axis, and the other of these points being prevented from moving transversely. By means of this movable connection, the axis of the emitted pencil of illumination rays may be adjusted laterally. The up and downward adjustment of the illumination apparatus is generally effected by means of a corresponding adjusting device. Provision is usually made that the source of light proper may be focused relatively to the optical system or vice versa.

It is advisable to connect the holder to a lever arm which may be rotated on and fixed to the said rod. In other words, the holder is conveniently placed, for instance, on a disc which is rotatable about an eccentric point and may be fixed by means of a clamping screw.

Figure 2:
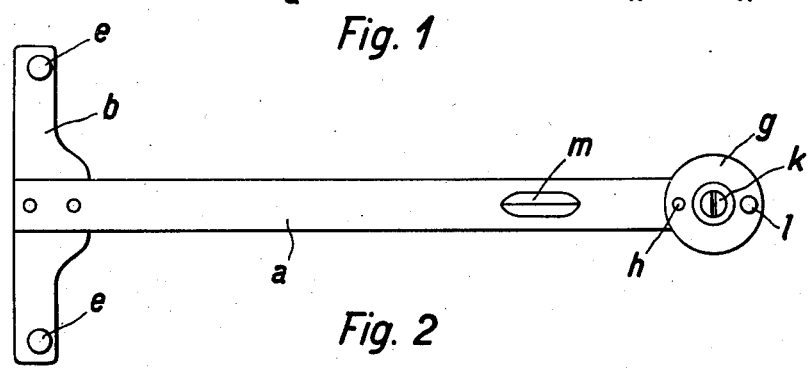
Figure 3:
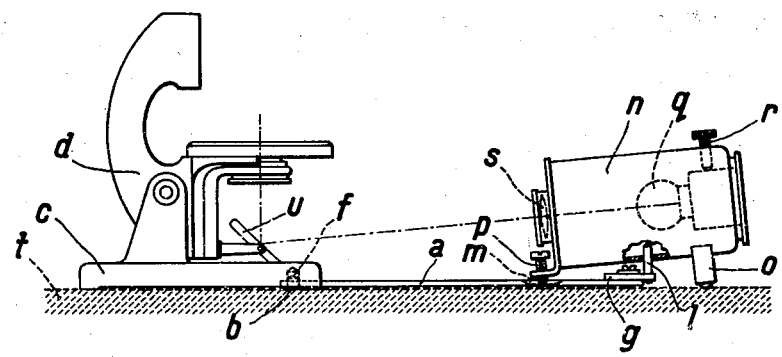

The accompanying drawing illustrates a constructional example of the invention. Figures 1 and 2 represent this example in part-sectional elevation and in top view, respectively. Figure 3 shows in part-sectional view and on a reduced scale how the device is used.

A rod $a$ and a transverse piece $b$ are so riveted to each other as to represent a T. According to the horseshoe opening in the foot $c$ of a microscope stand $d$, the ends of the piece $b$ are provided with two pins $e$ which fit narrowly into holes $f$ in the microscope foot $c$. At the other end of the rod $a$, a disc $g$ representing a lever arm is so provided as to be rotatable about an eccentric pin $h$. The disc $g$ has a hole $i$ which is traversed by a fixing screw $k$ to be screwed into the rod $a$. The disc $g$ has a holder consisting of a pin $l$. Into the rod $a$ is milled a groove $m$.

The device is used for temporarily connecting an illumination apparatus to the microscope stand $d$. The illumination apparatus has a housing $n$ which is supported by a foot $o$ and a screw $p$ that may be adjusted up and downwardly. The housing $n$ contains a lens $s$ as well as a glowlamp $q$ which is adjustable in axial direction and which is held in position by means of a screw $r$.

When the device is to be used, the foot $c$ of the microscope stand $d$ is so placed on the rod $b$, which rests on a table $t$ or the like, that the pins $e$ extend into the holes $f$, as a consequence of which the device is given a definite position relatively to the microscope stand $d$. The lower side of the housing $n$ of the illumination apparatus is provided with a hole that corresponds to the pin $l$. The illumination apparatus is given such a position that the screw $p$ and the bolt $l$ extend into the groove $m$ and the hole in the housing $n$, respectively, and that the foot $o$ rests against the table $t$. Upon having so adjusted the glowlamp $q$ in the housing $n$ that its incandescent filament is as near the focal plane of the lens $s$ as possible, the screw $p$ is so turned that the emitted pencil of approximately parallel rays is given such a direction with regard to height as to strike the middle of the illuminating mirror $u$ on the stand $d$. Subsequently to having loosened the screw $k$, the lateral direction of the pencil of illumination rays may be adjusted to the centre of the mirror $u$, and this by rotating accordingly the disc $g$ about the bolt $h$ and screwing up the screw $k$. When the illumination apparatus has once been correctly adjusted relatively to the microscope, the different parts may be given the correct positions relatively to each other subsequently to each interruption of the microscopic work, and this simply by assembling them.

We claim:

1. A device for temporarily connecting an illumination apparatus to a microscope, comprising a rod, at least two projecting parts for connecting the rod to the foot of the microscope, these projecting parts being disposed at the one end of the rod, the rod having a longitudinal recess for guiding one end of the illumination apparatus parallel to the rod and a holder for connecting the rod to the illumination apparatus, this holder and the said recess being provided on the other end of the rod, the said holder being disposed on the rod and displaceable approximately at right angles to the line connecting it to the said recess, and the longitudinal direction of the said recess coinciding with the said connecting line.

2. A device according to claim 1, comprising a lever arm rotatably mounted on the said rod, the free end of the lever arm being provided with the said holder, and means for fixing the said lever arm on the said rod.

3. A microscopic instrument consisting of a microscope stand provided with a foot, an illumination apparatus and a rod for temporarily connecting the illumination apparatus to the microscope stand, the said foot being provided with at least two recesses, a corresponding number of projecting parts being disposed at the one end of the rod and adapted to extend into the said recesses in the microscope foot, the said rod being provided with a longitudinal recess, a holder, this holder and the said longitudinal recess being disposed on the other end of the said rod, means for moving the said holder on the rod at approximately right angles to the straight line connecting it to the said longitudinal recess, the direction of the said longitudinal recess coinciding with the said connecting line, means for guiding one end of the said illumination apparatus on the said rod and adapted to extend into the said longitudinal recess, the said guiding means being movable at approximately right angles to the axis of the pencil of illumination rays and attached to the illumination apparatus, and means for fixing the said holder to the said illumination apparatus.

WALTHER BAUERSFELD
MAX HÜBSCHMANN.